Sept. 16, 1941.  J. F. GEIBEL  2,256,246
WELDING APPARATUS
Filed Oct. 6, 1939  3 Sheets-Sheet 1
Fig. 1.
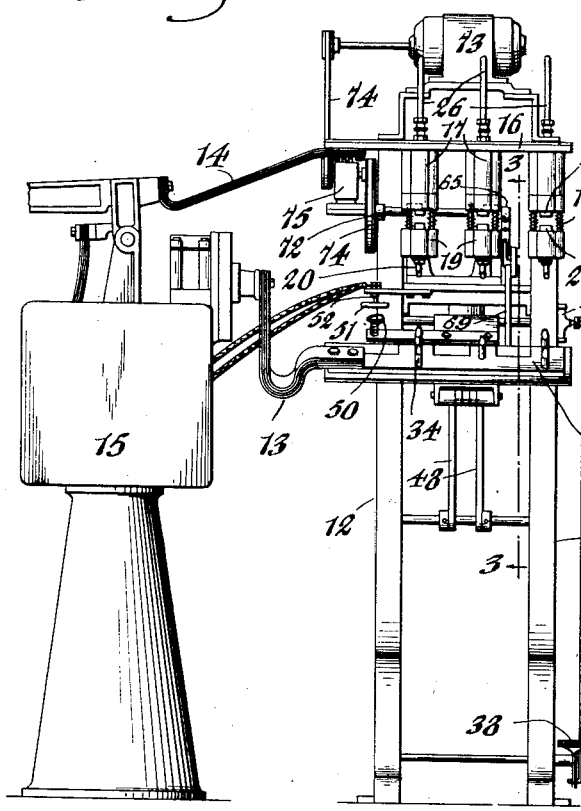
Fig. 2.
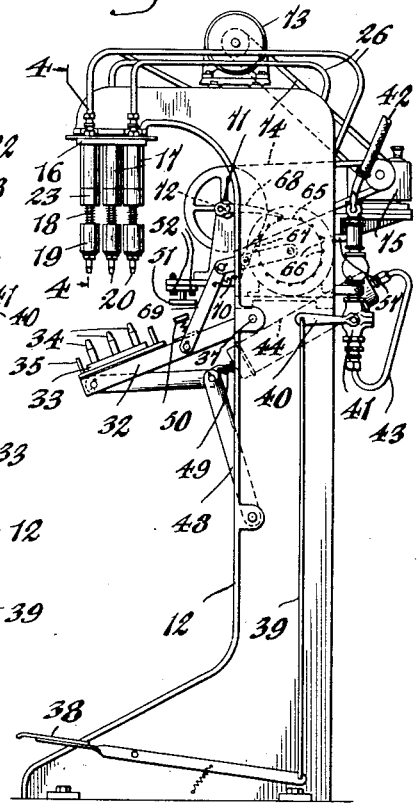
Fig. 3.
INVENTOR
John F. Geibel,
BY
Walter P. Geyer
ATTORNEY Sept. 16, 1941.  J. F. GEIBEL  2,256,246
WELDING APPARATUS
Filed Oct. 6, 1939  3 Sheets-Sheet 2
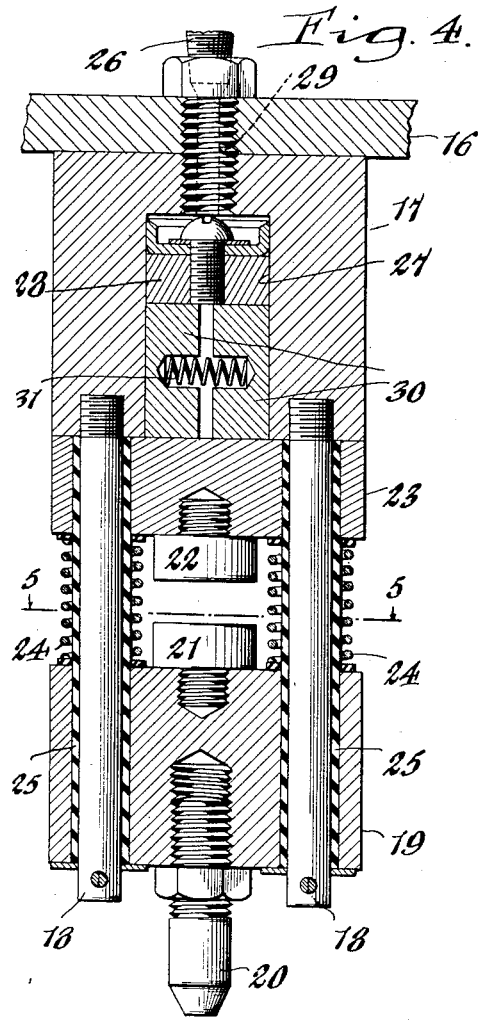
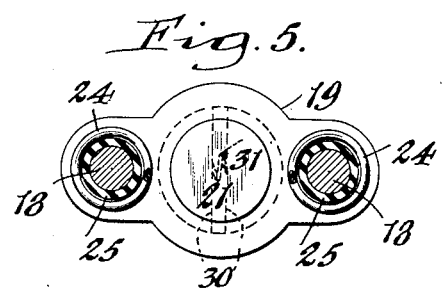
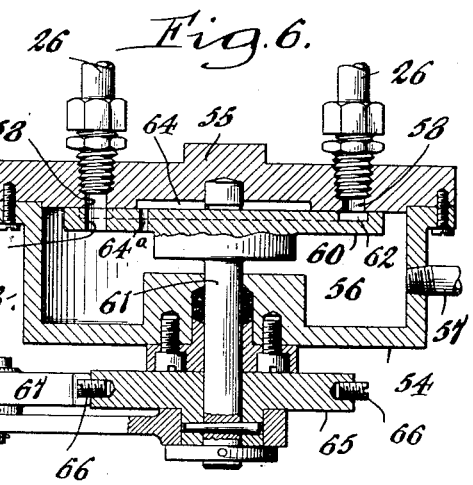
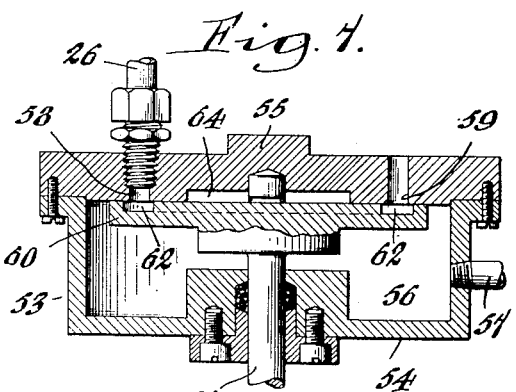
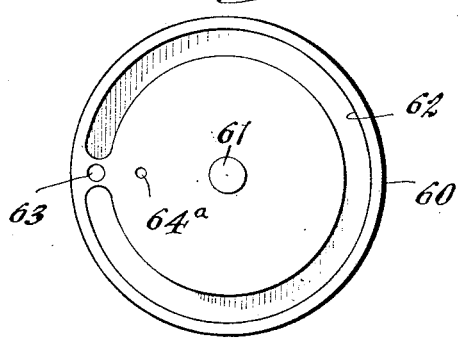
INVENTOR
John F. Geibel,
BY
Walter P. Geyer
ATTORNEY Sept. 16, 1941.   J. F. GEIBEL   2,256,246
WELDING APPARATUS
Filed Oct. 6, 1939   3 Sheets-Sheet 3

INVENTOR
John F. Geibel,
BY
Walter P. Geyer
ATTORNEY

Patented Sept. 16, 1941

2,256,246

UNITED STATES PATENT OFFICE 2,256,246

WELDING APPARATUS

John F. Geibel, Buffalo, N. Y., assignor to Master Metal Products, Inc., Buffalo, N. Y., a corporation of New York Application October 6, 1939, Serial No. 298,288

14 Claims. (Cl. 219—4)

This invention relates generally to spot welding equipment but more particularly to a multiple spot welding apparatus which may be employed as an attachment to various types of welding units for producing a plurality of welds in predetermined sequence.

It has for one of its objects to provide a multiple spot welder wherein a movable work holder is pneumatically controlled to bring the work into register with a plurality of electrodes, and a mechanically operated timing device which pneumatically controls the closing of the electrode circuit in rapid sequential order.

Another object of the invention is to provide a welding apparatus of this character wherein the work is held in contact with the electrodes under pressure after which time the electrode circuits are completed in sequence by mechanically timed pneumatic means.

A further object of the invention is to provide a multiple spot welder which is simple, compact and inexpensive in construction, reliable and efficient in operation and whose parts are not liable to get out of order.

Other features of the invention reside in the construction and arrangement of parts hereinafter described and particularly pointed out in the appended claims.

Figure 9:
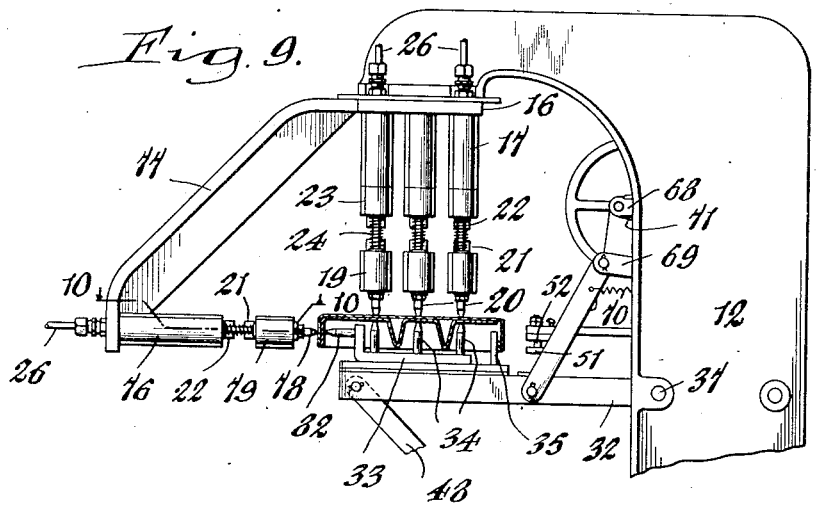
Figure 10:
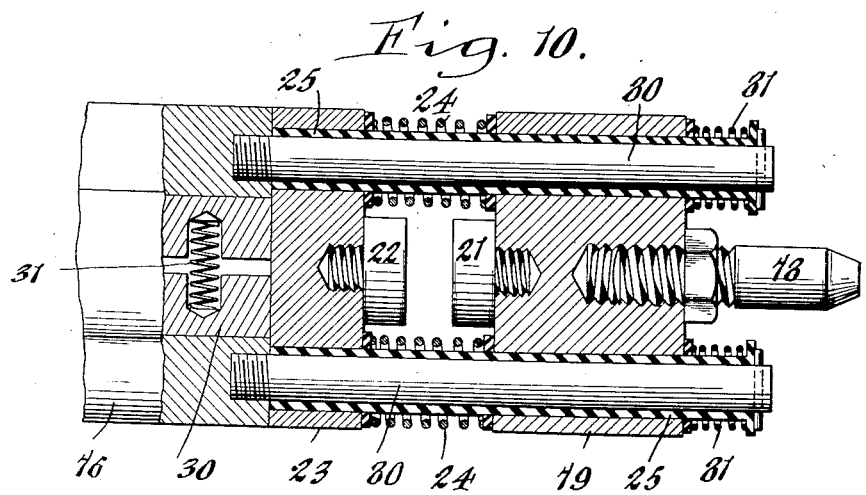

In the accompanying drawings:

Figure 1 is a front elevational view of the multiple spot welding apparatus embodying my invention. Figure 2 is a side elevation thereof. Figure 3 is an enlarged fragmentary vertical section taken in the plane of line 3—3, Figure 1, showing the work in position for welding. Figure 4 is an enlarged fragmentary vertical section taken on line 4—4, Figure 2, of one of the vertical electrodes. Figure 5 is a horizontal section taken on line 5—5, Figure 4. Figure 6 is a fragmentary horizontal section taken on line 6—6, Figure 3, of the air valve control mechanism in an operative or air-actuating position. Figure 7 is a similar view showing the parts in an inoperative or exhausting position. Figure 8 is a plan view of the valve disk of the valve mechanism. Figure 9 is a fragmentary side elevation of a modified multiple spot welder attachment showing the electrodes striking the work from the side. Figure 10 is an enlarged horizontal section taken on line 10—10, Figure 9 of the side electrode.

Similar characters of reference indicate corresponding parts throughout the several views.

Referring now to the drawings, the numeral 12 indicates a frame or standard upon which the working parts of my multiple spot welder apparatus are mounted, this apparatus as depicted in the drawings, by way of example, being in the form of an attachment for ready connection to the secondary leads or conductors 13 and 14, respectively, of a spot welder unit 15 of any well known type. Secured to the upper end of the frame and insulated therefrom is a combined conductor and supporting plate 16 which is connected to the secondary lead 14 of the welder unit and to which a plurality of pendant electrode-holders or cylinders 17 are connected. Applied to each of these holders are suspended for vertical movement on spaced parallel rods or studs 18 associated therewith is a lower cross-head 19 which carries an electrode 20 at its lower end. Attached to the top side of this cross-head is a contact button 21 which is in line with a mating button 22 secured to an upper pneumatically-actuated cross-head 23 also guided for vertical movement upon the studs 18. Compression springs 24 are provided about the studs 18 between the cross-heads 19 and 23 to maintain them and the contacts 21, 22 in spaced relation as seen in Figure 4. The holders and their companion cross-heads are made of copper or other suitable conducting material and insulated sleeves 25 are preferably provided about the studs between the cross-heads. The upper cross-head 23 is adapted to be actuated in a downwardly direction to perform an operative welding stroke at a predetermined time to bring the contact buttons 21 and 22 into register to complete the secondary circuit to its electrode 20. This movement of the upper cross-head is accomplished by air pressure which is admitted through a pipe connection 26 to the upper end of the holder 17. Each holder is provided in its lower portion with a cylinder 27 in which is arranged a pneumatically-operated piston 28, the upper end of the cylinder having a port 29 communicating with the companion air pipe 26. Interposed between and in contacting relation with the piston 28 and the upper cross-head 23 is a sectional disk 30 of copper or like material and whose sections are constantly urged into contact with the walls of the cylinder 27 by a spring 31. It will be seen that when air under pressure is admitted to the cylinder through its port 29 the piston 28 together with the upper cross-head 23 will be forced downwardly against the tension of the springs 24 to bring the contact 22 into register with the mating contact 21 of the lower cross-head 19 to close the secondary circuit. The current from the secondary lead 14 flows to the conductor plate 16 into the holder 17, segmental disk 30, crosshead 23, contacting buttons 22 and 21, and thence into the lower cross-head 19 to the electrode 20. When the air pressure is released, the springs 24 urge the upper cross-head and piston to normal position.

Disposed below and movable vertically toward and from welding relation with the plurality of electrodes 20 is a combined work and welder-point supporting table or platform 32 having a conductor plate 33 mounted thereon in insulated relation thereto and having a plurality of fixed conductor points 34 rising therefrom and corresponding in number to and adapted for alining registration with the companion electrodes 20, the plate being connected to the secondary lead 13 of the spot welder unit 15. The table 32, which may be provided with guide-pins 35 or the like for properly retaining the work 36 in position for welding, as shown in Figure 3, is preferably hinged at 37 to the frame 12 to swing vertically to and from a substantially horizontal operative position. The vertical movements of the table are controlled pneumatically by the operator of the machine through the medium of a foot pedal 38 connected by a link 39 to the control lever 40 of an air valve 41. This valve is connected at one side to an air supply line 42 and at its other side by a branch line 43 to a cylinder 44 pivoted to the frame 12 and having a piston 45 operating therein whose rod 46 is connected to a pin 47 of a toggle or foldable lever assembly 48 which is connected at its opposite ends to the frame 12 and work table 32, as seen in Figures 2 and 3. A spring 49 is interposed between the frame and the center joint of the toggle assembly to facilitate breakage of the toggle when the air is exhausted from the cylinder 44 to lower the table. The table has a yieldable abutment 50 rising therefrom adjacent its hinged end, which, in the raised position of the table, is adapted to close a switch included in the primary circuit of the spot welder unit 15, such switch including a movable element 51 and fixed elements 52 arranged to be bridged by the former in the elevated position of the table. The closing of the switch 51, 52 establishes the primary circuit of the welder so that when pneumatic pressure is applied in predetermined sequence to the pistons 28 of the respective electrode holders 17, the piston-controlled contacts 21 and 22 are closed, this completing the circuit to perform the welding operation. When the table is lowered, this switch is automatically opened.

Means are provided for automatically governing the actuation of the multiple electrodes 20 in predetermined sequence or progression so that the welding-points on the work are affected in a like manner, and to this end I preferably employ a mechanically-operated valve indicated generally by the numeral 53 consisting of a casing 54 and cover 55 which form an air chamber 56. This chamber has an air inlet pipe 57 which is connected to the air supply line 42 and a plurality of outlet ports 58 arranged in an annular row in the cover 55 and respectively connected by the corresponding pipes 26 with the electrode-holders 17. An exhaust port 59 is also provided in the cover which is common to the respective pipe-lines 26 and which is adapted at predetermined times to effect the exhausting of the respective cylinders 27 after an operative stroke has been imparted to the companion pistons 28. Adapted to control the supply of air to and its exhaust from the respective cylinders 27 is a rotary disk-like valve 60 arranged in the casing 54 in facial contact with the ported cover 55 and mounted on a horizontal shaft 61 journaled in such casing. As shown in Figures 7 and 8, this disk-valve has an annularly-disposed groove-like port or recess 62 in its inner or contacting face and one or more air outlet ports 63 common to and adapted to progressively register during rotation of the valve with one or another of the casing outlet ports 58 to supply air to the respective cylinders 27. At predetermined times in the movement of the valve 60, the annular port 62 serves to connect the ports 58 with the exhaust port 59 to exhaust the cylinders 27. For the purpose of balancing the pressure in the contacting face of the valve, I provide the cover with a recess or chamber 64 and the valve with a registering port 64a for establishing communication between such chamber and the air chamber 56.

To progressively govern the actuation of the electrode-pistons 28, the disk-valve 60 is adapted to be intermittently driven by a ratchet and feed pawl-like mechanism preferably consisting of a wheel 65 fixed on the valve-shaft 61 and having toothed-like projections on its periphery in the form of set screws 66 or the like in spaced relation simulating that of the ports 58. Cooperating with the radial-screws 66 for advancing the wheel and its connected disk valve are feed pawls 67 and 68, the feed pawl 67 being operatively associated with the work table 32 to impart an initial or pre-setting movement to the valve when the work table is elevated to its substantially horizontal operating position, while the companion pawl 68 is automatically actuated to intermittently advance the valve so as to automatically govern the progressive operative strokes of the respective multiple electrodes 20. The pawl 67 is mounted on a vertically-swinging toggle connection 69 pivotally interposed between the work table and the valve-shaft 61, a spring 70 urging the pawl into engagement with the periphery of the wheel 65. As the work table is elevated to the position shown in Figure 3, the pawl 67 contacts a mating screw on the wheel 65 to advance such wheel and the disk valve a fraction of a revolution, namely, a distance sufficient to present a given set screw 66 into the immediate operative path of the companion pawl 68, so that when the latter is actuated in the manner to be presently described, the wheel 65 is intermittently advanced to govern the flow of air to the respective electrode-controlling cylinders 27. At the completion of a given welding operation, the valve-disk 60 is in exhausting communication through its annular exhaust port 62 with the cylinder of the last-actuated electrode 20, so that before the next multiple welding operation can be effected, the valve-disk must be actuated to present its port 63 with a companion registering port 58 and this is effected initially by the combined action of both pawls 67 and 68 and subsequently by the pawl 68. Air pressure is retained on a given electrode for each revolution of the pawl-actuating crank 71 or until the valve is moved to its next position by the pawl 68.

The intermittently-actuated pawl 68 is driven from a crank arm 71 applied to a shaft 72 suitably journaled in the upper part of the frame 12 and driven from an electric motor 73 by a belt and pulley connection 74 and an interposed speed-reducing unit 75. As shown in Figure 3, the several screws 66 are equi-distant apart with the exception that at one or more points along the periphery of the wheel 65, depending upon the number of multiple electrodes employed in a given welding operation, an additional space or spaces are provided between adjoining screws by eliminating one or more of them, whereby gaps are provided about the periphery of the wheel 65 to permit an idling action of the constantly moving feed pawl 68 during such time that may elapse between the completion of a given welding operation and before the start of another welding operation.

In the embodiment of the invention depicted in Figures 9 and 10, I have shown in addition to the vertical arrangement of electrodes a set of electrodes disposed substantially horizontally for effecting the formation of welds not only in a horizontal plane but also in a vertical plane. The upright electrodes and associated parts are provided with the same reference characters as heretofore employed, and the numeral 76 indicates a horizontally-disposed cylinder, identical in construction to the cylinders 27, mounted on an arm or bracket 77 constituting a continuation of the conductor-plate 16 and disposed forwardly of the table 32, and the numeral 78 indicates the electrodes 20. In this case, however, the cross-head 79 to which the electrode 78 is connected, is adapted to be projected toward the work during the operative stroke of the piston and, after the weld has been made and the companion cylinder exhausted, such cross-head is adapted to be yieldingly returned to its initial position. To this end, the guide rods 80 project beyond the inner end of the cross-head and coil springs 81 are applied thereto which tend constantly to urge the cross-head to a retracted position. When the work is applied to the table 32 and the contacts 21, 22 are closed, the further stroke of the piston will project the cross-head 79 forwardly to bring the electrode 78 into operative engagement with the work. When the air pressure is exhausted from the cylinder the springs 81 will then automatically restore the cross-head and its electrode to its initial position clear of the work.

In this form of the invention the conductor points 82 companion to the electrodes 78 are mounted in fixed relation on the table and at right angles to the conductor points 34.

I claim as my invention:

1. In a welding apparatus, a frame having relatively movable electrode-supporting members mounted thereon between which the work to be welded is adapted to be placed, a plurality of fixed electrodes applied to one of said members, a plurality of companion individually displaceable electrodes applied to the other member, normally-open, circuit-closing contacts operatively associated with said displaceable electrodes, and means operatively connected to the respective contacts of said displaceable electrodes for bringing them into circuit-closing relation in predetermined sequence to successively render the companion sets of electrodes operative.

2. In a welding apparatus, a frame having relatively movable electrode supporting members mounted thereon between which the work to be welded is adapted to be placed, a plurality of fixed electrodes applied to one of said members, a plurality of companion individually displaceable electrodes applied to the other member and each having normally-open, circuit-closing contacts thereon, means connected to one of said electrode-bearing members for presenting it together with the work into operative relation with the companion electrode-bearing member, means operatively connected to the contacts of said displaceable electrodes for bringing them into circuit-closing relation in predetermined sequence to successively render the companion sets of electrodes operative, and means governed by the relative movement of said electrode-bearing members into operative relation for initiating said means for rendering the contacts of the displaceable electrodes operative in sequence.

3. In a welding apparatus, a frame having relatively movable electrode-supporting members mounted thereon between which the work to be welded is adapted to be placed, a plurality of fixed electrodes applied to one of said members, a plurality of companion individually displaceable electrodes applied to the other member and each having normally-open, circuit-closing contacts thereon, means operatively connected to said displaceable electrodes for bringing them into circuit-closing relation in predetermined sequence to successively render the companion sets of electrodes operative, an electric circuit including said electrodes, and a switch in said circuit operatively associated with and governed by said relatively movable members.

4. In a welding apparatus, a fixed support having a plurality of individually displaceable electrodes thereon, a movable support having a plurality of companion fixed electrodes mounted thereon and adapted to support the work to be welded, one electrode of a companion set of electrodes having normally-open, circuit-closing contacts thereon, operator-controlled means operatively connected to said movable support for governing the movements of the latter to bring its electrodes and the work into and out of welding relation with the companion displaceable electrodes, and means operatively connected to said circuit-closing contacts of companion sets of electrodes for bringing them in predetermined sequence into circuit-closing relation.

5. In a welding apparatus, a fixed support having a plurality of individually displaceable electrodes thereon, a movable support having a plurality of companion fixed electrodes mounted thereon and adapted to support the work to be welded, operator-controlled means operatively connected to said movable support for governing the movements of the latter to bring its electrodes and the work into and out of welding relation with the companion displaceable electrodes, an electric circuit including said electrodes, a switch in said circuit operatively associated with said movable support for initiating the closing of the circuit when such support is brought into operative relation with the displaceable electrodes, a plurality of normally-open contacts in said circuit and operatively associated with said displaceable electrodes, respectively, and means for automatically closing said contacts in sequence to establish the welding circuit of said electrodes.

6. In a welding apparatus, relatively movable supports between which the work to be welded is adapted to be placed, fixed electrodes applied to one of said supports, companion, individually displaceable electrodes applied to the other support for yieldable engagement with the work and including normally-open, circuit-closing contacts, and a pneumatically-operated mechanism associated with each of said displaceable electrodes and including means for actuating said contacts to circuit-closing position for completing the welding circuit at a predetermined time in the actuation of such mechanism.

7. In a welding apparatus, relatively movable supports between which the work to be welded is adapted to be placed, fixed electrodes applied to one of said supports, companion, individually displaceable electrodes applied to the other support for yieldable engagement with the work and including normally-open, circuit-closing contacts, a pneumatically-operated mechanism associated with each of said displaceable electrodes and including means for actuating said contacts to circuit-closing position for completing the welding circuit at a predetermined time in the actuation of such mechanism, and timing means operatively connected to said pneumatic mechanisms for actuating them in sequence to successively render the companion sets of electrodes operative.

8. In a welding apparatus, relatively movable supports between which the work to be welded is adapted to be placed, fixed electrodes applied to one of said supports, companion, individually displaceable electrodes applied to the other support for yieldable engagement with the work and including normally-open, circuit-closing contacts, a pneumatically-operated mechanism associated with each of said displaceable electrodes and including means for actuating said contacts to circuit-closing position for completing the welding circuit at a predetermined time in the actuation of such mechanism, means operatively connected to said pneumatic mechanisms for governing their actuation in sequence to bring said contacts into circuit-closing position to successively render the companion sets of electrodes operative, said means including an air supply chamber adapted for operative communication with said pneumatic mechanisms, respectively, valve means movable to one or another of a plurality of positions for establishing communication between said chamber and one or another of said pneumatic-mechanisms, and means for actuating said valve means in predetermined timed fashion.

9. In a welding apparatus, relatively movable supports between which the work to be welded is adapted to be placed, fixed electrodes applied to one of said supports, companion, individually displaceable electrodes applied to the other support for yieldable engagement with the work and including normally-open, circuit-closing contacts, a pneumatically-operated mechanism associated with each of said displaceable electrodes and including means for actuating said contacts to circuit-closing position for completing the welding circuit at a predetermined time in the actuation of such mechanism, means operatively connected to said pneumatic mechanisms for governing their actuation in sequence to bring said contacts into circuit-closing position to successively render the companion sets of electrodes operative, said means including an air supply chamber adapted for operative communication with said pneumatic mechanisms, respectively, adjustable valve means for establishing communication between said chamber and one or another of said pneumatic mechanisms at one time and for establishing communication between such mechanisms and the atmosphere at another time, and means operatively connected to said valve means for intermittently actuating it to its different governing positions.

10. In a welding apparatus, relatively movable supports between which the work to be welded is adapted to be placed, fixed electrodes applied to one of said supports, companion, individually displaceable electrodes applied to the other support for yieldable engagement with the work, and including normally open, circuit-closing contacts, a pneumatically-operated mechanism associated with each of said displaceable electrodes and including means for actuating said contacts to circuit-closing position for completing the welding circuit at a predetermined time in the actuation of such mechanism, means operatively connected to said pneumatic mechanisms for governing their actuation in sequence to bring said contacts into circuit-closing position to successively render the companion sets of electrodes operative, said means including an air supply chamber having a plurality of outlet ports therein connected to said pneumatic mechanisms, respectively, and an exhaust port, a rotary valve in said chamber having a port therein for registering with one or another of said outlet ports, means in said valve for establishing communication between said outlet ports and said exhaust port, and means operatively connected to said valve for intermittently actuating it to its different governing positions.

11. In a welding apparatus, relatively movable supports between which the work to be welded is adapted to be placed, fixed electrodes applied to one of said supports, companion, individually displaceable electrodes applied to the other support for yieldable engagement with the work and including normally-open, circuit-closing contacts, a pneumatically-operated mechanism associated with each of said displaceable electrodes and including means for actuating said contacts to circuit-closing position for completing the welding circuit at a predetermined time in the actuation of such mechanism, means operatively connected to said pneumatic mechanisms for governing their actuation in sequence to bring said contacts into circuit-closing position to successively render the companion sets of electrodes operative, said means including an air supply chamber adapted for operative communication with said pneumatic mechanisms, respectively, valve means movable to one or another of a plurality of positions for establishing communication between said chamber and one or another of said pneumatic-mechanisms, and ratchet and pawl means operatively connected to said valve means for actuating it intermittently to its different governing positions, said ratchet and pawl means having an idling position for rendering the valve means stationary during a relatively displaced position of said supports.

12. In a welding apparatus, relatively movable supports between which the work to be welded is adapted to be placed, fixed electrodes applied to one of said supports, companion, individually displaceable electrodes applied to the other support for yieldable engagement with the work, a pneumatically-operated mechanism associated with each of said displaceable electrodes and including circuit-closing contacts for completing the welding circuit at a predetermined time in the actuation of such mechanism, means operatively connected to said pneumatic mechanisms for governing their actuation in sequence to successively render the companion sets of electrodes operative, said means including an air supply chamber adapted for operative communication with said pneumatic mechanisms, respectively, valve means movable to one or another of a plurality of positions for establishing communication between said chamber and one or another of said pneumatic-mechanisms, ratchet and pawl means operatively connected to said valve means for actuating it intermittently to its different governing positions, said ratchet and pawl means having an idling position for rendering the valve means stationary during a relatively displaced position of said supports, and a feed pawl operatively connected to one of said supports and rendered operative to initiate said ratchet and pawl means when such supports are brought into welding position.

13. In a multiple spot welder, a plurality of sets of electrodes, a cylinder and piston operatively associated with one electrode of each set, a cross-head suspended from one end of said cylinder for displacement toward and from the same and constituting a support for such electrode, a piston-actuated cross-head yieldingly interposed between said cylinder and said first-named cross-head, contact elements applied to the opposing faces of said cross-heads, and means for operating said piston in its cylinder to cause its companion cross-head to be moved in a direction to close said contact elements.

14. In a multiple spot welder, relatively movable supports between which the work to be welded is adapted to be placed, fixed electrodes applied to one of said supports, individually displaceable electrodes applied to the other support and corresponding in number to and disposed for alinement with the companion fixed electrodes, a cylinder and piston unit operatively associated with each of said displaceable electrodes, guide means on said cylinder, cross-heads movably mounted on said guide means, one of said heads constituting a support for one of said last-named electrodes and the other head being disposed in operative relation to its companion piston, springs interposed between said heads for normally urging them in opposite directions, contact elements applied to the opposing faces of said cross-heads, fluid-pressure means operatively connected to said cylinders, and automatically-actuated valve control means for controlling the distribution of fluid to said cylinders, respectively, for governing the operative strokes of their companion pistons in predetermined sequence.

JOHN F. GEIBEL.